(12) United States Patent
Nilsson

(10) Patent No.: US 11,274,442 B2
(45) Date of Patent: Mar. 15, 2022

(54) SUSPENDED TILE SYSTEM AND ABSORBER TILE ELEMENT

(71) Applicant: SAINT-GOBAIN ECOPHON AB, Hyllinge (SE)

(72) Inventor: Thomas Nilsson, Helsingborg (SE)

(73) Assignee: SAINT-GOBAIN ECOPHON AB, Hyllinge (SE)

( * ) Notice: Subject to any disclaimer, the term of this patent is extended or adjusted under 35 U.S.C. 154(b) by 0 days.

(21) Appl. No.: 16/973,629

(22) PCT Filed: Jun. 11, 2019

(86) PCT No.: PCT/EP2019/065099
§ 371 (c)(1),
(2) Date: Dec. 9, 2020

(87) PCT Pub. No.: WO2019/243103
PCT Pub. Date: Dec. 26, 2019

(65) Prior Publication Data
US 2021/0164225 A1 Jun. 3, 2021

(30) Foreign Application Priority Data

Jun. 18, 2018 (EP) .................................... 18178271

(51) Int. Cl.
*E04B 9/22* (2006.01)
*E04B 9/36* (2006.01)
(Continued)

(52) U.S. Cl.
CPC .............. *E04B 9/225* (2013.01); *E04B 9/001* (2013.01); *E04B 9/18* (2013.01); *E04B 9/363* (2013.01); *E04B 2009/186* (2013.01)

(58) Field of Classification Search
CPC ... E04B 9/00; E04B 9/001; E04B 9/18; E04B 9/20; E04B 9/22; E04B 9/225; E04B 9/363; E04B 2009/186
See application file for complete search history.

(56) References Cited

U.S. PATENT DOCUMENTS 3,004,644 A * 10/1961 Hullraouelb ............ E04B 9/345
52/506.07
3,389,524 A * 6/1968 Weber ................... E04B 1/4107
52/713
(Continued)

FOREIGN PATENT DOCUMENTS

EP 2 546 430 A1 1/2013
EP 2 884 019 A1 6/2015
(Continued)

OTHER PUBLICATIONS

International Search Report dated Aug. 27, 2019 in PCT/EP2019/065099 filed on Jun. 11, 2019.

*Primary Examiner* — Jessie T Fonseca
(74) *Attorney, Agent, or Firm* — Oblon, McClelland, Maier & Neustadt, L.L.P.

(57) ABSTRACT

An absorber tile element includes compressed mineral fiber material and has a first major surface, an opposing second major surface and at least one side edge surface, and an anchor element associated with one of the first and second major surface or one of the at least one side edge surfaces. The anchor element includes a head portion and a threaded portion, the head portion defining an open cavity facing a top surface. An engagement member is arranged in the cavity, and arranged to engage with a hook element. The threaded portion is threaded into the absorber tile element such that the head portion becomes substantially recessed in the
(Continued)

absorber tile element. A corresponding tile system can includes the absorber tile element.

14 Claims, 8 Drawing Sheets

(51) Int. Cl.
*E04B 9/00* (2006.01)
*E04B 9/18* (2006.01)

(56) References Cited

U.S. PATENT DOCUMENTS

| | | | | |
|---|---|---|---|---|
| 3,859,889 | A * | 1/1975 | Fischer | E04B 9/18 |
| | | | | 411/75 |
| 5,127,785 | A * | 7/1992 | Faucher | E04B 9/18 |
| | | | | 411/440 |
| 2005/0211500 | A1 * | 9/2005 | Wendt | E04B 9/241 |
| | | | | 181/295 |
| 2012/0317915 | A1 * | 12/2012 | Koennecke | E04B 9/241 |
| | | | | 52/506.09 |
| 2015/0240490 | A1 * | 8/2015 | Firinga | E04B 9/12 |
| | | | | 52/506.05 |
| 2016/0333581 | A1 * | 11/2016 | Van Dore | E04B 9/18 |

FOREIGN PATENT DOCUMENTS

| | | | | |
|---|---|---|---|---|
| EP | 2 902 559 | A1 | 8/2015 | |
| FR | 2634240 | A1 * | 1/1990 | E04B 9/22 |
| FR | 2642780 | A1 * | 8/1990 | E04B 9/20 |

* cited by examiner

SUSPENDED TILE SYSTEM AND ABSORBER TILE ELEMENT

FILED OF THE INVENTION

The present invention generally relates to a tile system and an absorber tile element.

BACKGROUND OF THE INVENTION

A tile system in a room or in another accommodation may serve a variety of purposes. One purpose of having a tile system such as a suspended ceiling system may be to conceal an underside of a space, such as another room, which is located above the room. Another purpose may be to provide improved noise absorption and/or noise attenuation in and outside of the room. Tile systems for rooms or similar typically also include sound absorbing baffles in form of generally vertically suspended tiles. Another example of a tile system is a system of wall panels, where the wall panels are mounted on or in proximity to one or more walls of a room.

In case of a suspended ceiling system, the resulting plenum space located between the suspended ceiling and a main ceiling of the room may further be utilized to accommodate e.g. wiring, piping, as well as devices related to heating, ventilation and air condition. Typically, a suspended ceiling consists of a plurality of ceiling tiles which may be suspended from the main ceiling or structural ceiling. The ceiling tiles may be suspended from the main ceiling using wires or lines which are attached to the main ceiling and to the ceiling tiles such that the ceiling tiles become suspended below the main ceiling, thereby forming a suspended ceiling. The ceiling tiles may also be suspended using a profile framework or similar. Also baffles or wall panels may be suspended using various kinds of elements.

In order to suspend the tiles of a suspended ceiling system, the ceiling tiles may be provided with a number of fasteners which in turn may be connected to the wires or lines used to suspend the ceiling tiles. The fasteners are commonly fixed to the ceiling tiles using different techniques, such as being glued onto or being screwed into the ceiling tiles. Similarly, baffles and wall panels are commonly provided with a number of fasteners. According to common practice, the fasteners include some form of eye or hook which is used to connect to wires, lines or similar used to suspend the tiles.

The fasteners must provide a reliable connection to the tiles and at the same time offer a simple connection to the tiles.

The fasteners are commonly attached to the tiles at the construction site prior to installing the tiles. This means that a plurality of fasteners has to be connected or fixed to each tile. This work is time consuming. The time consuming work implies high costs due to e.g. personnel expenses.

Further, there is an imminent risk of positioning the fasteners in the wrong position as the installation is often conducted under tight time constraints.

It has been suggested to install the fasteners to the tiles off-site to reduce the work labor needed during installation of tiles. It has however proven difficult to achieve desired results as the fasteners are prone to damaging the tiles during e.g. handling, transportation and storage.

SUMMARY OF THE INVENTION

In view of the above, it is an object of the present invention is to provide an improved tile system and an improved absorber tile element.

Another object is to provide such a tile system and absorber tile element which are less time consuming to install.

Another object is to provide such a tile system and absorber tile element which ensure correct positioning of the anchor elements in relation to the absorber tile element, which in turn ensure a correct positioning of the absorber tile element in relation to the main ceiling or wall.

Another object is to provide such tile system and absorber tile element which reduces the risk of damaging the absorber tile elements during handling, transport and storage.

It is also an object to provide a cost effective tile system and absorber tile element.

To achieve at least one of the above objects and also other objects that will be evident from the following description, an absorber tile element having the features defined in claim 1 and an tile system according to claim 9 are provided according to the present inventive concept. Preferred variations to the inventive concept will be evident from the dependent claims.

More specifically, according to a first aspect, there is provided an absorber tile element comprising compressed mineral fiber material and having a first major surface, an opposing second major surface, and at least one side edge surface extending between the first major surface and the second major surface, an anchor element associated with one of the first major surface and the second major surface or one of the at least one side edge surfaces of the absorber tile element, wherein the anchor element comprises a head portion and a threaded portion, the head portion defining an open cavity facing a top surface of the head portion, wherein an engagement member is arranged in the cavity, and configured for engagement with a hook element, the threaded portion being threaded into the absorber tile element from the surface associated with the anchor element such that the head portion becomes substantially recessed in the absorber tile element.

Hereby an improved absorber tile element is provided.

The absorber tile element comprises compressed mineral fiber material and has a first major surface, an opposing second major surface and at least one side edge surface extending between the first major surface and the second major surface. In other words, the absorber tile element has typically a front side in form of the first major surface, a back side in form of the second major surface and at least one side edge surface. In case of a vertically suspended baffle, the major surfaces are however typically extending vertically and consequently each facing the interior of e.g. a room.

It should be noted that within the context of this application the term "absorber tile element" may be any type of element which is being suspendable from a structural ceiling or a wall to e.g. form part of or constitute a suspended ceiling, a set of baffles or a set of wall panels. The element may be free hanging in the sense that it does not contact any neighboring elements or does not have any neighboring elements. The element may also be suspendable such that is contacts neighboring elements. For natural reasons the same type of elements may be suspended as free hanging elements or as elements being in contact with neighboring elements. Further, the element may exhibit different shapes and may be made of different materials or material combinations. Furthermore, the element may be a decorative element and/or an element serving a technical purpose such as sound absorption, fire protection or concealing of piping or wiring.

The anchor element is associated with one of the first major surface and the second major surface or one of the at least one side edge surfaces of the absorber tile element. In practice, a plurality of anchor elements is typically used to suspend an absorber tile element. Four anchor elements are commonly used to suspend e.g. a ceiling tile, although any number of anchor elements may be used to advantage. The anchor element comprises a head portion and a threaded portion. The head portion and the threaded portion may be integrally formed or formed as separate parts being joined to form the anchor element. The head portion and the threaded portion may partially overlap, such that the thread of the threaded portion extends onto the head portion. The anchor element may be casted, molded or 3-D printed to give a few non-limiting examples. The anchor element may comprise metal and/or plastics. The anchor element may be made from a single metal or from a metal alloy. The anchor element may be made of a plastic material or of a mixture of plastic materials. The anchor element may be fiber reinforced.

The head portion of the anchor element defines an open cavity facing a top surface of the head portion. In other words, the head portion includes a cavity which opens at least partially towards the top surface of the anchor element. Hence, the cavity is accessible through an opening in the top surface of the head portion.

An engagement member is arranged in the cavity. This means that the engagement member is located within the cavity such that it does not protrude beyond the top surface of the head portion. By having the engagement member arranged in the cavity of the head portion, the engagement member will be recessed in the cavity of the head portion. The engagement member may be flush with the top surface of the head portion. Engagement member may mean any member, portion, part, element or similar which may be used to engage a hook element. The engagement member may be integrally formed with the anchor element or formed as a separate part which is joined with the anchor element.

The threaded portion of the anchor element is threaded into the absorber tile element from the first major surface, the second major surface, or one of the at least one side edge surfaces, such that the head portion becomes substantially recessed in the ceiling tile. In other words, the head portion of the anchor element will not protrude above the second major surface of the ceiling tile, or it will only protrude slightly above the second major surface of the ceiling tile. For instance, the head portion may include a relatively speaking thin flange which may be arranged to contact the surface of the absorber tile element into which the anchor element is screwed. In this case, the flange may protrude slightly above the surface of the absorber tile element. Thus, the term "substantially recessed" should in this context be construed as that no significant portion of the anchor element will protrude above the surface of the absorber tile element.

By the above arrangement of the engagement member and anchor element, significant advantages are achieved. The anchor elements of the tile system may be pre-mounted or pre-attached to the absorber tile elements or tiles of the tile system with a significantly reduced risk of damaging the tiles during handling, transport, storage etc. This because the anchor element is substantially recessed in the respective tiles, meaning that there are no significantly protruding portions which are otherwise prone to damaging the tile itself or other tiles e.g. being stacked on top of the tile concerned. Also the height of a stack of tiles may be significantly reduced since the tiles may be stacked directly on each other since there are no protruding portions of the anchor elements.

Further, since there are no substantial protruding portions of the anchor element, a reduced installation height or thickness is enabled. This may be a significant advantage in situations where e.g. a suspended ceiling is to be located close to a major ceiling or where a wall panel is to occupy as little space as possible.

Moreover, the fact that the anchor elements of the tile system may be pre-mounted brings about a significantly reduced risk of mounting the anchor elements in an undesired or wrongful position. Further, the installation time may be reduced as compared to when anchor elements are mounted on-site, bringing about a reduced installation cost.

The engagement member may comprise an elongated bar structure traversing the cavity of the head portion, which is advantageous in that a secure engagement may be realized between the engagement member and the hook element. Moreover, the use of an elongated bar structure traversing the cavity of the head portion allows for an efficient fabrication since the anchor element including the engagement member may be molded or cast.

The engagement member may comprise a loop structure arranged in the cavity of the head portion, which is advantageous in that a secure engagement may be realized between the engagement member and the hook element. The loop may be a closed loop having a non-broken circumference. The loop may be an open loop having a discontinuous circumference, like a hook. The loop may be formed separate from the anchor element and joined with the anchor element. Portions of the circumference of the loop may be formed by an interior surface or interior surfaces of the cavity of the head element.

The engagement member may be laterally displaced with respect to a central axis of the anchor element. This arrangement brings about several advantages. A lateral displacement of the engagement member enables that a suspension element supporting the hook element may become aligned with or centered with respect to a center axis of the anchor element even when a non-symmetric hook element is used. Further, a lateral displacement of the engagement member provides more room for the hook element during coupling and de-coupling of the same, thereby facilitating coupling and de-coupling of the hook element to/from the engagement member of the anchor element. Furthermore, a lateral displacement of the engagement member provides access to a central portion of the open cavity of the head portion.

The anchor element may be provided with a through hole extending along a central axis of the anchor element, which is advantageous in that a suspension element or similar may be provided through the trough hole, thereby enabling suspension of further objects below the absorber tile element. By this arrangement, a single suspension element for instance in form of a wire, may be used to suspend two or more tiles below each other.

The anchor element may have an extension in the interval of 10-150 mm, preferably 15-100 mm, along a central axis thereof, which is advantageous in that a secure connection to the absorber tile element may be provided.

The anchor element may have an extension in the interval of 10-100 mm, preferably 15-60 mm, in a direction transverse to a central axis thereof, which is advantageous in that a secure connection to the absorber tile element may be provided.

The threaded portion of the anchor element may comprise threads having a pitch in the interval of 4-10 mm, preferably 5-7 mm, which is advantageous in that a secure connection to the absorber tile element may be provided.

According to another aspect of the invention, there is provided a tile system comprising: an absorber tile element comprising provided with an anchor element as described above and a suspension element releasably coupled to the anchor element for suspension of the absorber tile element, wherein the suspension element comprises a hook element hooking the engagement member of the anchor element.

The suspension element is releasably coupled to the anchor element for suspension of the absorber tile element. The suspension element comprises a hook element hooking the engagement member of the anchor element. By this arrangement, the suspension element may easily be coupled to or de-coupled from the absorber tile element. The hook and associated hooking engagement of the engagement member may consequently simplify installation and reduce installation time. The suspension element typically includes a wire, a line, a cable, a cord, a thread, a rod, a string, a chain, a rope, a profile element, a wall fixed hook, a wall profile or similar.

The engagement member and/or the hook element may be configured to align a body of the suspension element with a central axis of the anchor element, which is advantageous in that the anchor element may be exposed to a symmetrically distributed load. The body of the suspension element may include a wire, a line, a cable, a cord, a thread, a rod, a string, a chain, a rope or similar.

In general, features of this aspect of the invention provide similar advantages as discussed above in relation to the previous aspect of the invention. Consequently, said advantages will not be repeated in order to avoid undue repetition.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise.

BRIEF DESCRIPTION OF THE DRAWINGS

The above, as well as additional objects, features and advantages of the present invention, will be better understood through the following illustrative and non-limiting detailed description of preferred variants of the present inventive concept, with reference to the appended drawings, where the same reference numerals will be used for similar elements, wherein:

FIG. 2b is a cross sectional view of the anchor element of FIG. 2a.

FIG. 3b is a cross sectional view of the anchor element of FIG. 3a.

DETAILED DESCRIPTION

Figure 1:
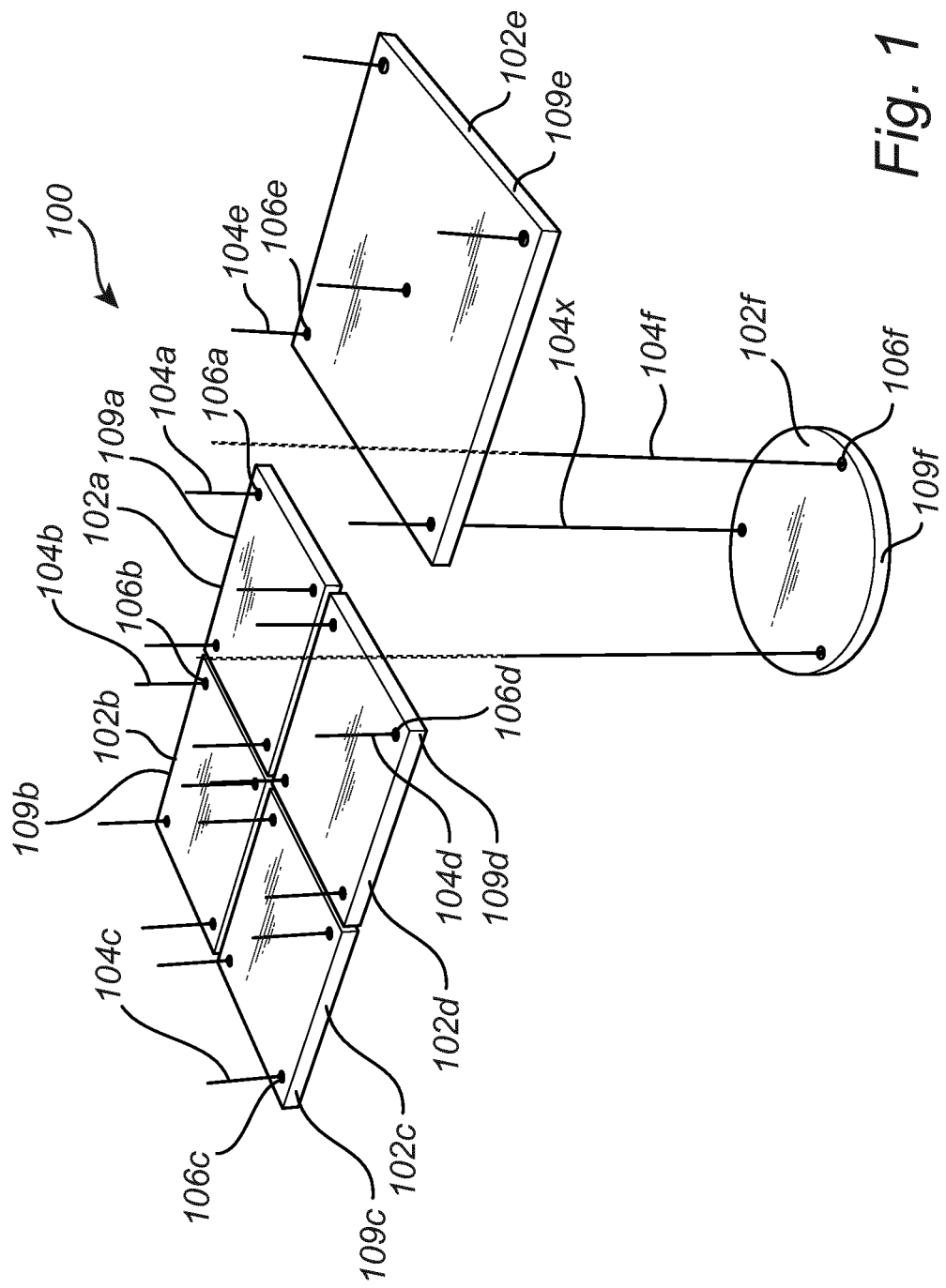
FIG. 1 conceptually illustrates tile system in form of a suspended ceiling system.

The present inventive concept will now be described more fully hereinafter with reference to the accompanying drawings, in which preferred variants of the inventive concept are shown. This inventive concept may, however, be embodied in many different forms and should not be construed as limited to the variants set forth herein; rather, these variants are provided for thoroughness and completeness, and fully convey the scope of the inventive concept to the skilled person. Like reference numerals refer to like elements throughout the description.

Initially a tile system in form of a suspended ceiling system 100 will be described with reference to FIGS. 1-4. Following the description of the suspended ceiling system 100 a baffle system 200 will be described with reference to FIG. 5 and a tile system in form of a wall panel system 300 will be described with reference to FIG. 6.

FIG. 1 is a schematic perspective view of conceptually depicting a tile system 100 in form of a suspended ceiling system 100. For reasons of simplicity there are six planar tiles or objects in form of ceiling tiles 102a-f illustrated in FIG. 1. It is however to be understood that any number of ceiling tiles may be used according to the present inventive concept. Each ceiling tile 102a-f has a first major surface intended to face an interior of a room and an opposing second major surface. Further, each ceiling tile 102a-e has four side edge surfaces 109a-e extending between the respective first and second major surfaces. However, ceiling tile 102f has a single side edge surface 109f circumferencing the ceiling tile 102f at an outer periphery thereof and extending between the first and second major surfaces.

FIG. 1. Illustrates how the ceiling tiles 102a-f, forming a suspended ceiling, are suspended from a structural ceiling of a building, not shown.

Each ceiling tile 102a-f is suspended by means of suspension elements 104a-f, 104x in form of wires. Other relevant examples of suspension elements are a line, a cable, a cord, a thread, a rod, a string, a chain, a rope or a combination thereof. The ceiling tiles 102a-d are suspended using four suspension elements 104a-d each. Ceiling tile 102e is suspended using five suspension elements 104e, whereas ceiling tile 102f is suspended using three suspension elements 104f. Each suspension elements 104a-f are attached to the ceiling tiles in corresponding attachment points. Each attachment point includes an anchor element 106a-f.

Ceiling tile 102f is suspended below ceiling tile 102e, in the sense that ceiling tile 102f is located further below the structural ceiling and partially under ceiling tile 102e. Ceiling tiles 102e and 102f share one suspension element 104x, which is used for suspending both ceiling tile 102e and ceiling tile 102f. The depicted suspension element 104x is a wire like suspension elements 104a-f.

The ceiling tiles 102a-f, comprises compressed mineral fiber material. Suitable examples of compressed mineral fiber material are glass wool, mineral wool and rock wool, however other materials are also conceivable without departing from the scope of the inventive concept. Ceiling tiles comprising the exemplified materials are known to exhibit sound absorbing properties.

As can be seen in FIG. 1, the ceiling tiles 102a-f are of different sizes and different shapes. Ceiling tiles 102a-d are all of a square shape and are of the same size. Ceiling tile 102e on the other hand is larger compared to ceiling tiles 102a-d. Also ceiling tile 102d is in the form of a square. Ceiling tile 102f on the other hand is exhibiting a circular shape. As is evident, the size of and shape of the ceiling tiles 102a-f may be altered into any size and shape without departing from the scope of the present inventive concept. Also the arrangement in terms of how the respective ceiling tiles 102a-f are suspended with respect to each other and the room in which they are present may be altered to suit the needs presently at hand. For instance, the ceiling tiles 102a-f may be arranged at different heights and/or may be inclined relative each other.

In FIG. 1 the ceiling tiles 102a-f are illustrated as being free hanging, meaning that the respective ceiling tiles 102a-f are not in contact with each other. It is however possible to arrange the ceiling tiles 102a-f such that the respective ceiling tiles 102a-f are in contact with neighboring ceiling tiles or some of the neighboring ceiling tiles.

Further, the ceiling tiles 102a-f may be provided with a layer, not shown, on the side facing the interior of the room in which the ceiling tiles 102a-f are suspended. The layer may in turn be provided with decorative elements such a paint, a print, a sticker or similar. In other words, the appearance of the ceiling tiles 102a-f may be altered to suit the needs of a particular installation.

It will now be described in greater detail, with reference to FIGS. 2a and 2b, how suspension element 104a is used to suspend ceiling tile 102a by being connected to the ceiling tile 102a by means of anchor element 106a. Also the design of the anchor element 106a will be described in greater detail. Although the below description will be made with reference to ceiling tile 102a, suspension element 104a and anchor element 106a, the below description is equally valid for any of the ceiling tiles 102a-f, any of the suspension elements 104a-f and any of the anchor elements 106a-f.

Figure 2A:
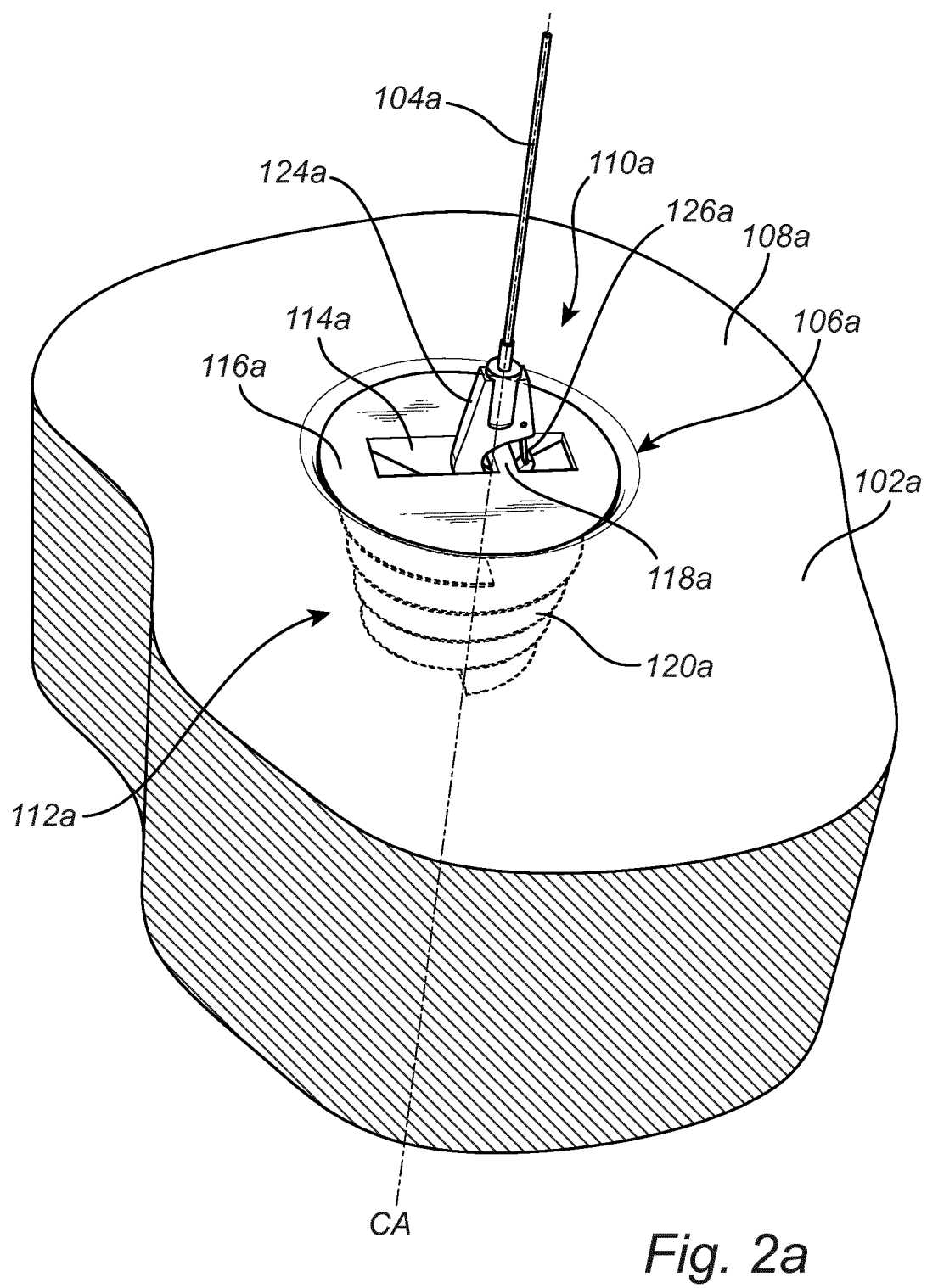
FIG. 2a is a perspective detail view of an anchor element of the suspended ceiling system of FIG. 1
Figure 2B:
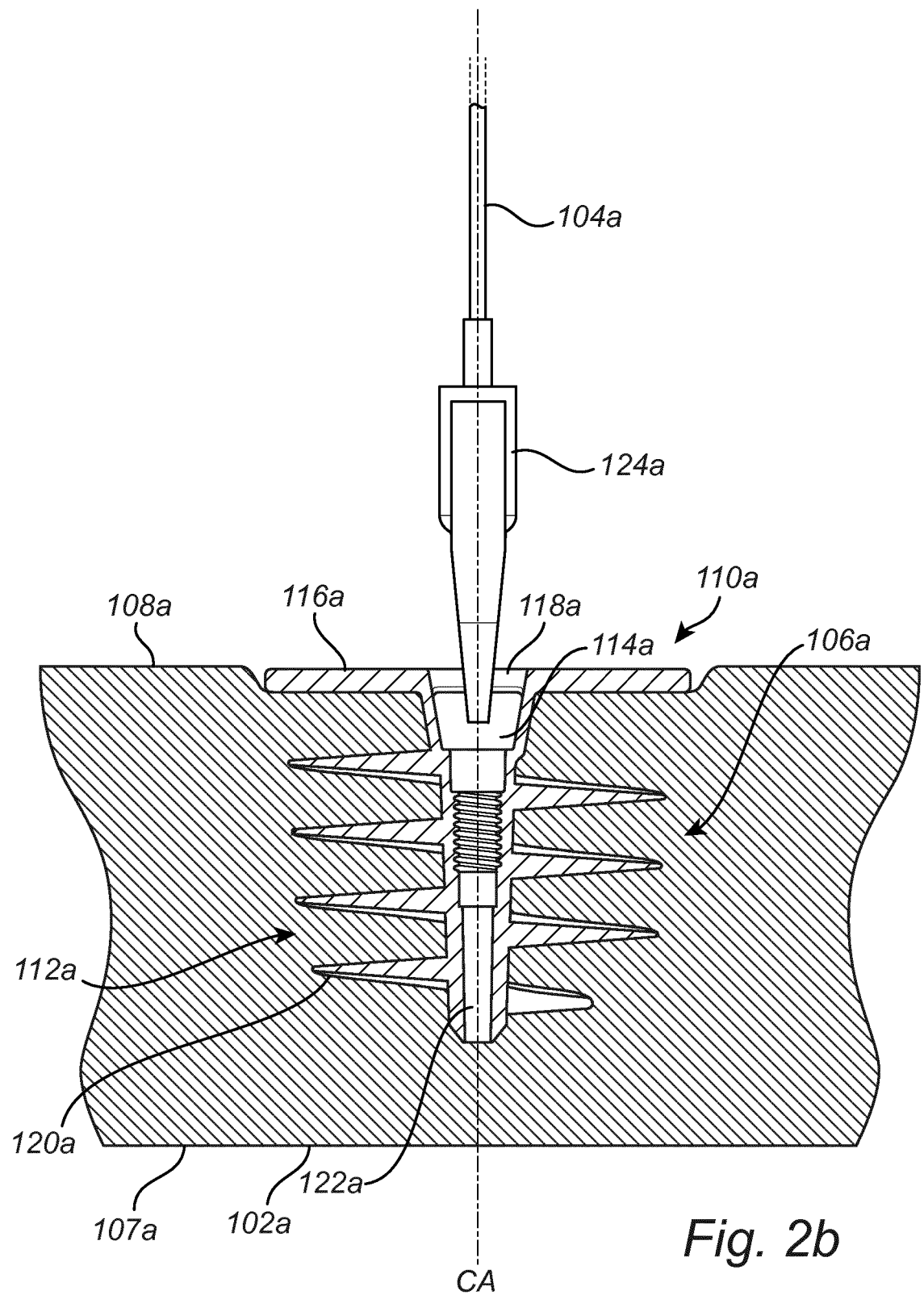

In FIGS. 2a and 2b it is depicted how anchor element 106a is screwed into ceiling tile 102a, at the second major surface 108a thereof. The first major surface 107a is facing the interior of the room in which the ceiling tile 102a is suspended. The anchor element 106a is screwed into the ceiling tile 102a such that the anchor element 106a becomes completely recessed in the ceiling tile 102a. As is depicted, the second major surface 108a is deflected at the location of the anchor element 106a, such that the anchor element 106a becomes completely recessed in the ceiling tile 102a.

The depicted anchor element 106a of FIGS. 2a and 2b comprises a head portion 110a and a threaded portion 112a. The head portion 110a is located above the threaded portion 112a. In the depicted anchor element 106a the head portion 110a and the threaded portion 112a are integrally formed by being molded form metal. The head portion of the depicted anchor element 106a has a diameter of 37 mm. However, diameters in the range of 10-100 mm are generally feasible depending e.g. on the thickness and weight of the ceiling tile 102a to be suspended.

The head portion 110a includes an open cavity 114a. The cavity 114a is facing the top surface 116a of the head portion 110a. In other words, the cavity 114a is open in the sense that it is accessible form the top surface 116a of the head portion 110a. The cavity 114a is formed by molded separation walls. The cavity 114a is elongated and has a conical cross section along a longitudinal direction thereof. The cavity 114a has a rectangular cross section across the longitudinal direction thereof.

An engagement member 118a is arranged in the cavity 114a. An upper surface of the engagement member 118a is flush with the top surface 116a. In the depicted anchor element 106a, the engagement member 118a is formed as a bar structure traversing the cavity 114a. In other words, the bar structure forming the engagement member 118a is extending across the cavity 114a. The engagement member 118a is integrally formed with the head portion 110a and the threaded portion 112a of the anchor element 106a.

The engagement member 118a is laterally displaced with respect to the central axis CA of the anchor element 106a. This means in practice that the cavity 114a is accessible by means of two differently sized openings, located on either side of the engagement member 118a.

The threaded portion 112a includes a thread 120a. The thread of the depicted anchor element 106a is conical in the sense that its radius increases towards the head portion 110a. The depicted thread 120a has a radius of 10 mm at its starting point and a radius of 16.6 mm at its end point, i.e. where the thread 120a terminates at the head portion 110a. The pitch of the thread 120 is 6 mm. This means that the separation between consecutive turns of the thread 120a is 6 mm. Examples of feasible pitches are between 4 and 10 mm. The periphery of the thread 120a is preferably relatively speaking sharp so as to cut through the material of the ceiling tile 102a, thereby facilitating its insertion into the ceiling tile 102a. Also the conical demolding of the thread 120a facilitates its insertion into the material of the ceiling tile 102a.

The anchor element 106a is provided with a through hole 122a extending along the central axis CA of the anchor element 106a. The narrower bottom portion of the through hole 122a has a diameter of 2.3 mm, thereby facilitating insertion of a wire or similar having a diameter of 2.0 mm. A central portion of the through hole 122a may e.g. be provided with an internal M4 thread. The function of the through hole 122a will be discussed in greater detail below with reference to FIG. 4.

As is seen in FIGS. 2a and 2b, the suspension element 104a includes a hook element 124a provided at the end of the suspension element 104a. The hook element 124a is hooked around the engagement member 118a, thereby providing a releasable coupling between the anchor element 106a and the suspension element 104a. In other words, the hook element 124a may be coupled and de-coupled from the engagement member 118a. The hook element 124a is provided with a spring-loaded safety bar 126a in order to prevent undesired and unintentional de-coupling of the hook element 124a from the engagement member 118a. The spring-loaded safety bar 126a enables a simple snap-in engagement where the spring-loaded safety bar 126a does not have to be actuated separately.

The hook element 124a is shaped such that the body of the suspension element 104a aligns with the central axis CA of the anchor element 106a. In other words, the shape of the hook element 124a compensates for the lateral displacement of the engagement member 118a with respect to a central axis CA of the anchor element 106a, such that the body of the suspension element 104a becomes aligned with the central axis CA of the anchor element. It is to be understood that the lateral displacement of the engagement member 118a and the shape of the hook element 124a may be varied while still resulting in that the body of the suspension element 104a becomes aligned with the central axis CA of the anchor element 106a. It is also to be understood that the body of the suspension element 104a may be offset with respect to the central axis CA of the anchor element 106a without departing from the present inventive concept.

The depicted anchor element 106a has a length, i.e. an extension along the central axis CA of the anchor element 106a, of 32.5 mm. Typical feasible lengths are between 10-150 mm, depending e.g. on the thickness of the ceiling tiles to be suspended.

It will now be described in greater detail, with reference to FIGS. 3a and 3b, how suspension element 104b is used to suspend ceiling tile 102b by being connected to the ceiling tile 102b by means of anchor element 106b. Also the design of the anchor element 106b which is different from the anchor element 106a of FIGS. 2a and 2b will be described in greater detail. Although the below description will be made with reference to ceiling tile 102b, suspension element 104b and anchor element 106b, the below description is equally valid for any of the ceiling tiles 102a-f, any of the suspension elements 104a-f and any of the anchor elements 106a-f.

Figure 3A:
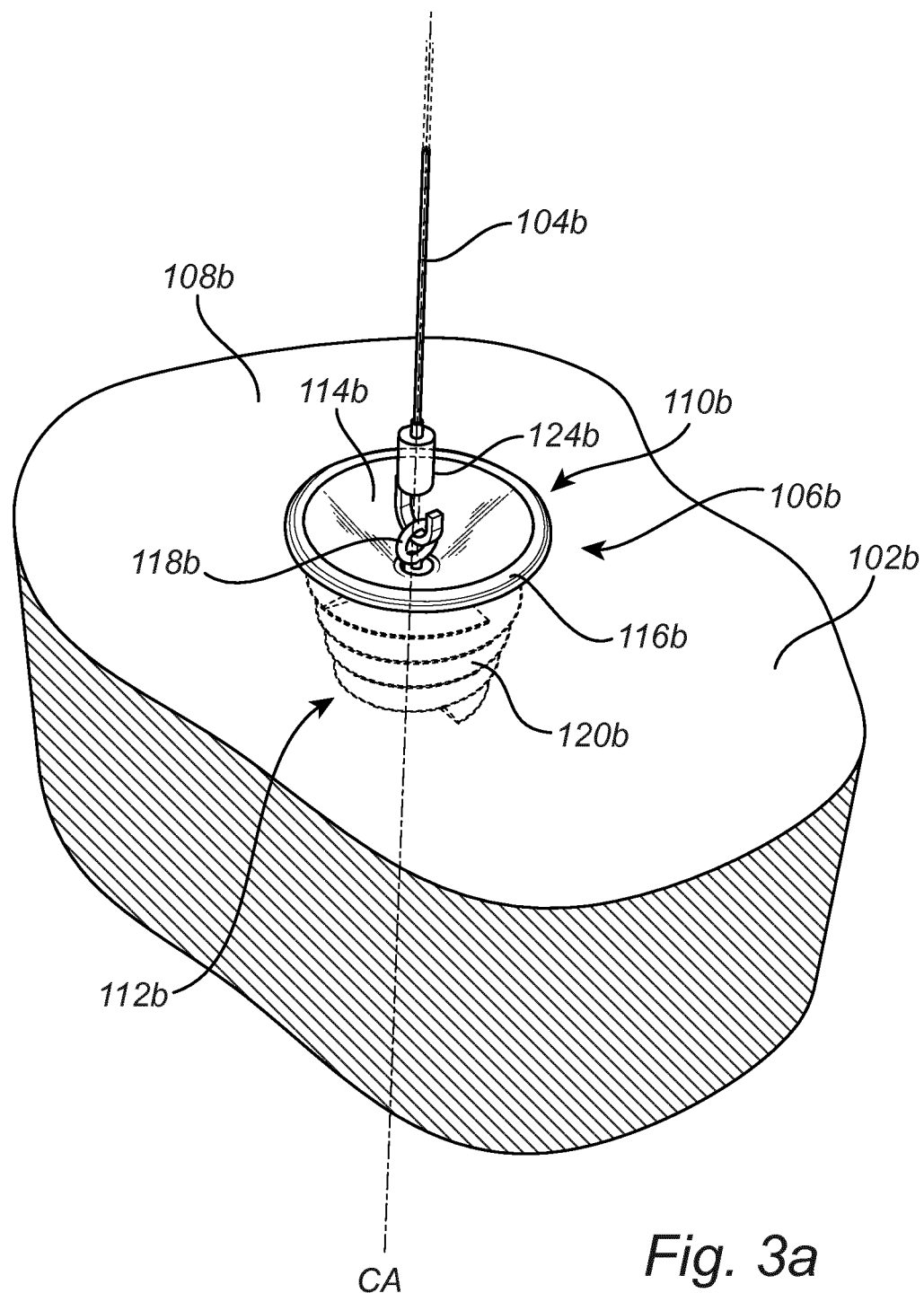
FIG. 3a is a perspective detail view of another anchor element of the suspended ceiling system of FIG. 1.
Figure 3B:
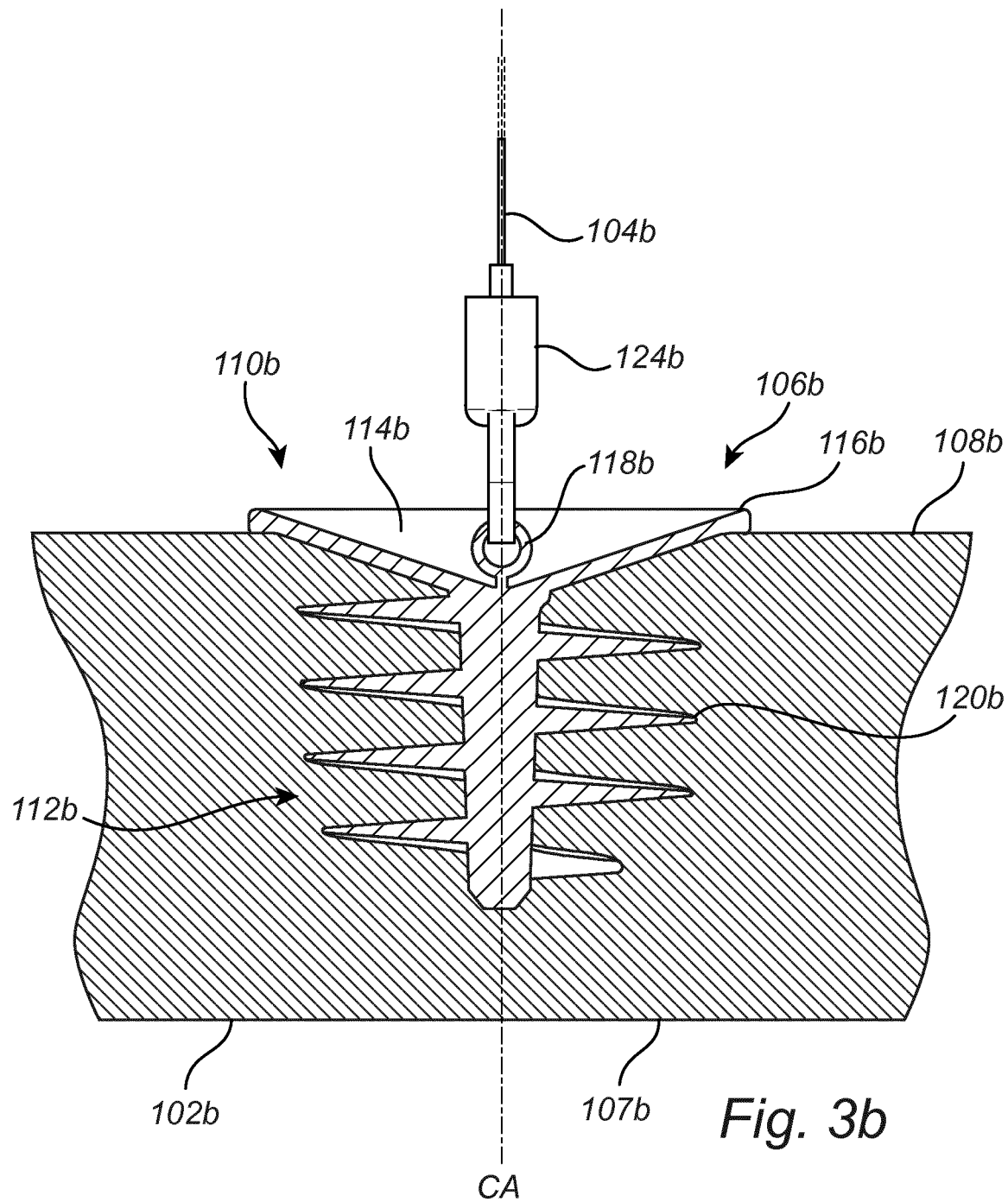

In FIGS. 3a and 3b it is depicted how anchor element 106b is screwed into ceiling tile 102b, at the second major surface 108b thereof. The anchor element 106b is screwed into the ceiling tile 102b such that the anchor element 106b becomes substantially recessed in the ceiling tile 102b. As is depicted, the second major surface 108b is flat, i.e. not deflected, at the location of the anchor element 106b. Hence, a minor top portion of the anchor element 106b protrudes slightly above the second major surface 108b.

The depicted anchor element 106b of FIGS. 3a and 3b comprises a head portion 110b and a threaded portion 112b, like the anchor element 106a of FIGS. 2a and 2b. The head portion 110b is located above the threaded portion 112b. In the depicted anchor element 106b the head portion 110b and the threaded portion 112b are integrally formed by being molded form metal. The head portion of the depicted anchor element 106b has a diameter of 37 mm. However, diameters in the range of 10-100 mm are generally feasible depending e.g. on the thickness and weight of the ceiling tile to be suspended, as discussed above.

The head portion 110b includes an open cavity 114b. The cavity 114b is facing a top surface 116b of the head portion 110b. The cavity 114b is formed by molded separation walls. The cavity 114b is rotationally symmetric and has a conical cross section.

An engagement member 118b is arranged in the cavity 114b. An uppermost portion of the engagement member 118b is located below the top surface 116b of the anchor element 106b. Hence, the engagement member 118b is completely arranged within the cavity 114b. In the depicted anchor element 106b, the engagement member 118b is formed as a loop structure arranged in the cavity 114b of the head portion 110b. The engagement member 118b is formed separately from the head portion 110b and the threaded portion 112b of the anchor element 106b, and subsequently fastened within the cavity 114b of the head portion 110b. The depicted engagement member 118b is formed as a closed loop which is screwed into a threaded hole provided in the recess 114b. The engagement member 118b, i.e. the loop, may however be fastened within the cavity 114b using other fastening techniques, such as soldering, welding or gluing to give a few non-limiting examples. Also other shapes of the engagement member 118b are feasible. For instance, the engagement member 118b may be formed as an open loop or like a hook.

The engagement member 118b is aligned with respect to the central axis CA of the anchor element 106b.

The threaded portion 112b includes a thread 120b. The thread 120b is similar to the thread 120a of FIGS. 2a and 2b described above, why the thread 120b will not be described in greater detail to avoid undue repetition.

As is seen in FIGS. 3a and 3b, the suspension element 104b includes a hook element 124b provided at an end of the suspension element 104b. The hook element 124b is hooked around the engagement member 118b, thereby providing a releasable coupling between the anchor element 106b and the suspension element 104b. In other words, the hook element 124b may be coupled and de-coupled from the engagement member 118b just like the hook element 124a of FIGS. 2a and 2b. The hook element 124b is formed as an open hook void of any safety bar or similar.

The hook element 124b is shaped such that the body of the suspension element 104b aligns with the central axis CA of the anchor element 106b. This means that the hook element 124b is aligned with the central axis CA of the anchor element 106b when hooking the engagement member 118b. It is however to be understood that the hook element 124b may be differently shaped so as to e.g. provide a lateral displacement with respect to the central axis CA of the anchor element 106b.

The length of the anchor element 106b is similar to the length of the anchor element 106a of FIGS. 2a and 2b, as described above.

Figure 4:
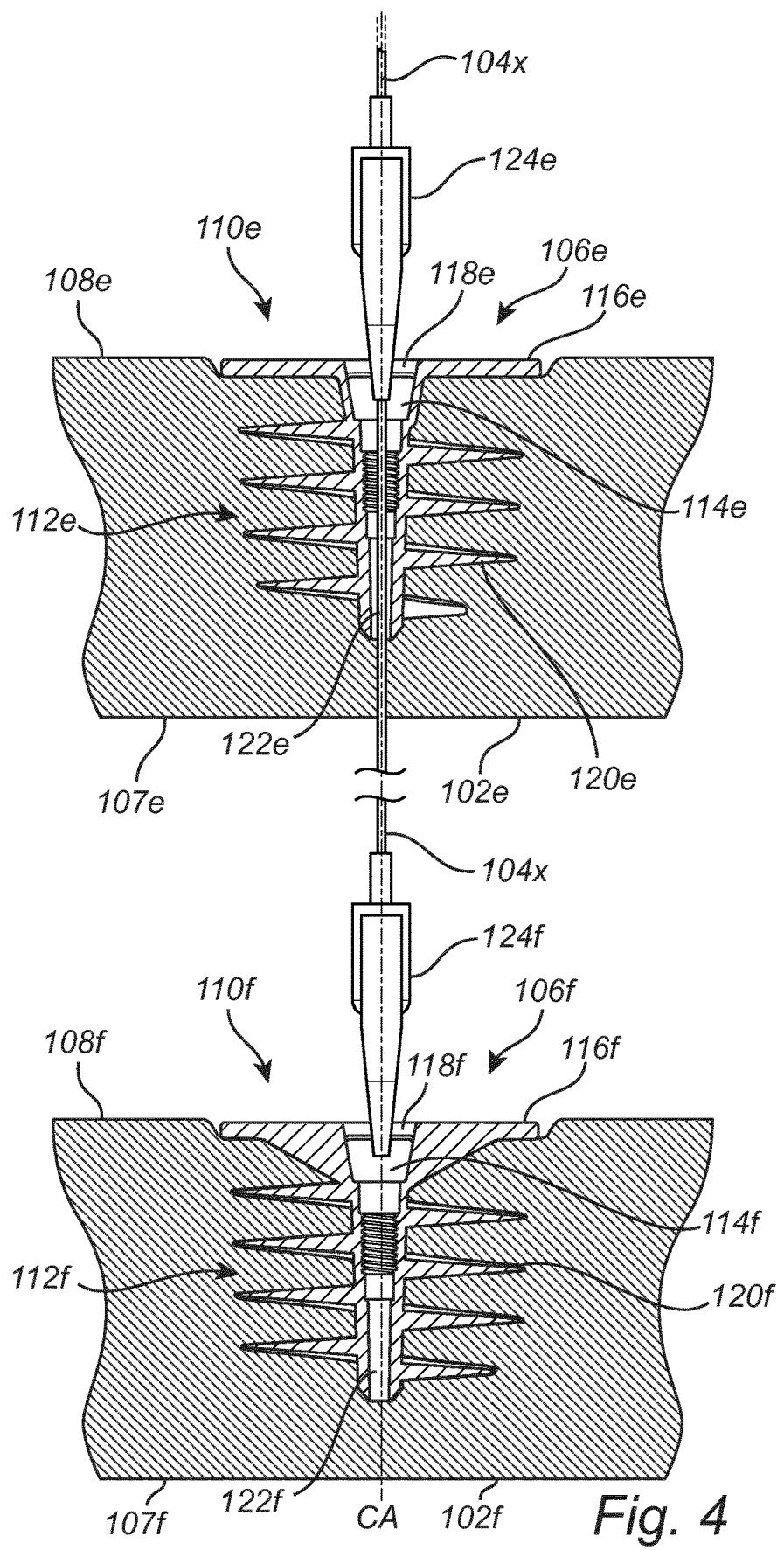
FIG. 4 is a cross sectional detail view of the suspended ceiling system of FIG. 1.

Now referring to FIG. 4, here it is conceptually depicted in greater detail how ceiling tiles 102e and 102f are suspended using the common suspension element 104x, and respective anchor elements 106e and 106f.

Anchor element 106e used for suspending ceiling tile 102e is of the same type as anchor element 102a described above in relation to FIGS. 2a and 2b. Hence, anchor element 102e will not be described in greater detail to avoid undue repetition.

Anchor element 106f used for suspending ceiling tile 102f is similar to anchor element 102a described above in relation to FIGS. 2a and 2b. However, the head portion 110f is formed differently as compared to the head portions 110a and 110e. The head portion 110f of anchor element 106f has a rotationally symmetric underside meaning that the open cavity 114f is formed in an otherwise rotationally symmetric head portion 110f as opposed to the head portions 110a and 110e where the open cavities 114a and 114e are formed with relatively speaking thin molded separation walls. However, the anchor element 106f has a corresponding function to the anchor elements 106a and 106e.

As can be seen in FIG. 4, the suspension element 104x is fed through the through hole 122e of anchor element 106e and the ceiling tile 102e. Hence, the suspension element r 104x exits ceiling tile 102e on its first major surface 107e, i.e. the surface facing the interior of the room in which the ceiling tile 102e is suspended.

The suspension element 104x is fed through a through hole of the hook element 124e, meaning that the suspension element 104x continues below or after the hook element 124e, as illustrated in FIG. 4. The hook element 124e is similar to the hook element 124a and will not be described in greater detail to avoid undue repetition. The hook element 124e hooks the engagement member 118e of anchor element 106e.

A hook element 124f is provided at the end of suspension element 104x, as illustrated in FIG. 4. Also hook element 124f is similar to the hook element 124a and will not be described in greater detail to avoid undue repetition. The hook element 124f hooks the engagement member 118f of anchor element 106f.

By this arrangement, ceiling tile 102e is suspended above ceiling tile 102f using the common suspension element 104x, as described above. It is to be understood that three or more ceiling tiles may be suspended after each other in a vertical direction using a common suspension element r as described above.

Figure 5:
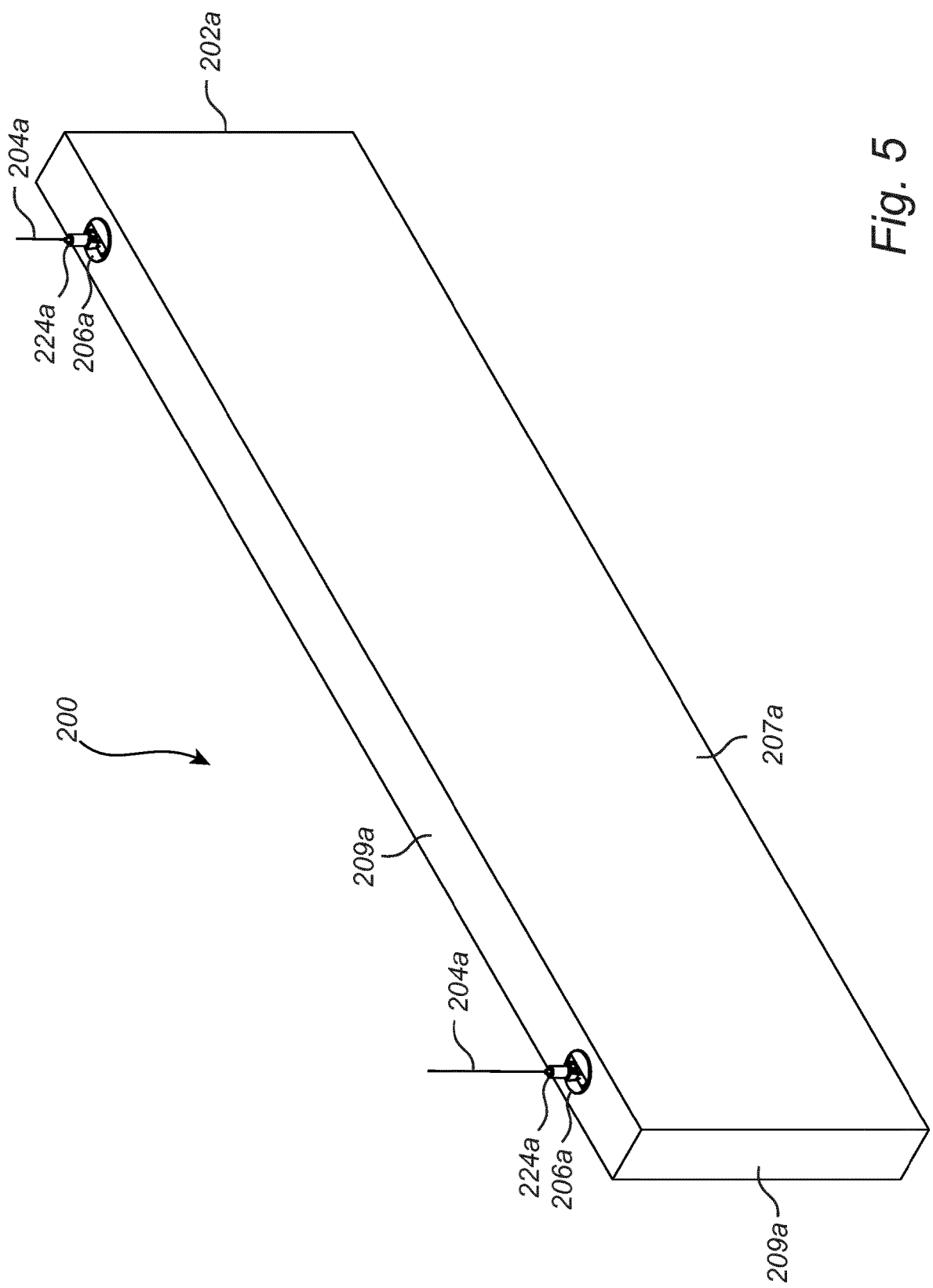
FIG. 5 is a perspective view of a suspended baffle.

Now referring to FIG. 5, here is conceptually depicted a tile system 200 in form of a baffle system 200. For reasons of simplicity there is a single planar tile in form a baffle 202a illustrated in FIG. 5. It is however to be understood that any number of baffles 202a may be used according to the present inventive concept. The baffle 202a has a first major surface 207a and an opposing second major surface. Further, the baffle 202a has four side edge surfaces 209a extending between the respective first 207a and second major surfaces.

The baffle 202a, comprises compressed mineral fiber material. Suitable examples of compressed mineral fiber material are glass wool, mineral wool and rock wool, however other materials are also conceivable without departing from the scope of the inventive concept. Baffles comprising the exemplified materials are known to exhibit sound absorbing properties.

The baffle 202a is suspended by means of two suspension elements 204a in form of wires. Other relevant examples of suspension elements are a line, a cable, a cord, a thread, a rod, a string, a chain, a rope or a combination thereof. Each suspension element 204a includes a hook element 224a provided at the end of the suspension elements 204a. Each suspension element 204a is attached to the baffle 202a in corresponding attachment points. Each attachment point includes an anchor element 206a. The anchor elements 206a and the hook elements 124a are of the type described above in conjunction with FIGS. 2a and 2b. Accordingly, the anchor elements 206a and the hook elements 124a will not be described in detail below to avoid undue repetition.

The anchor elements 206a are screwed into one of the side edge surfaces 209a of the baffle 202a. By screwing the anchor elements 206a into one of the side edge surfaces 209a the baffle 202a may be vertically suspended as illustrated in FIG. 5.

Figure 6:
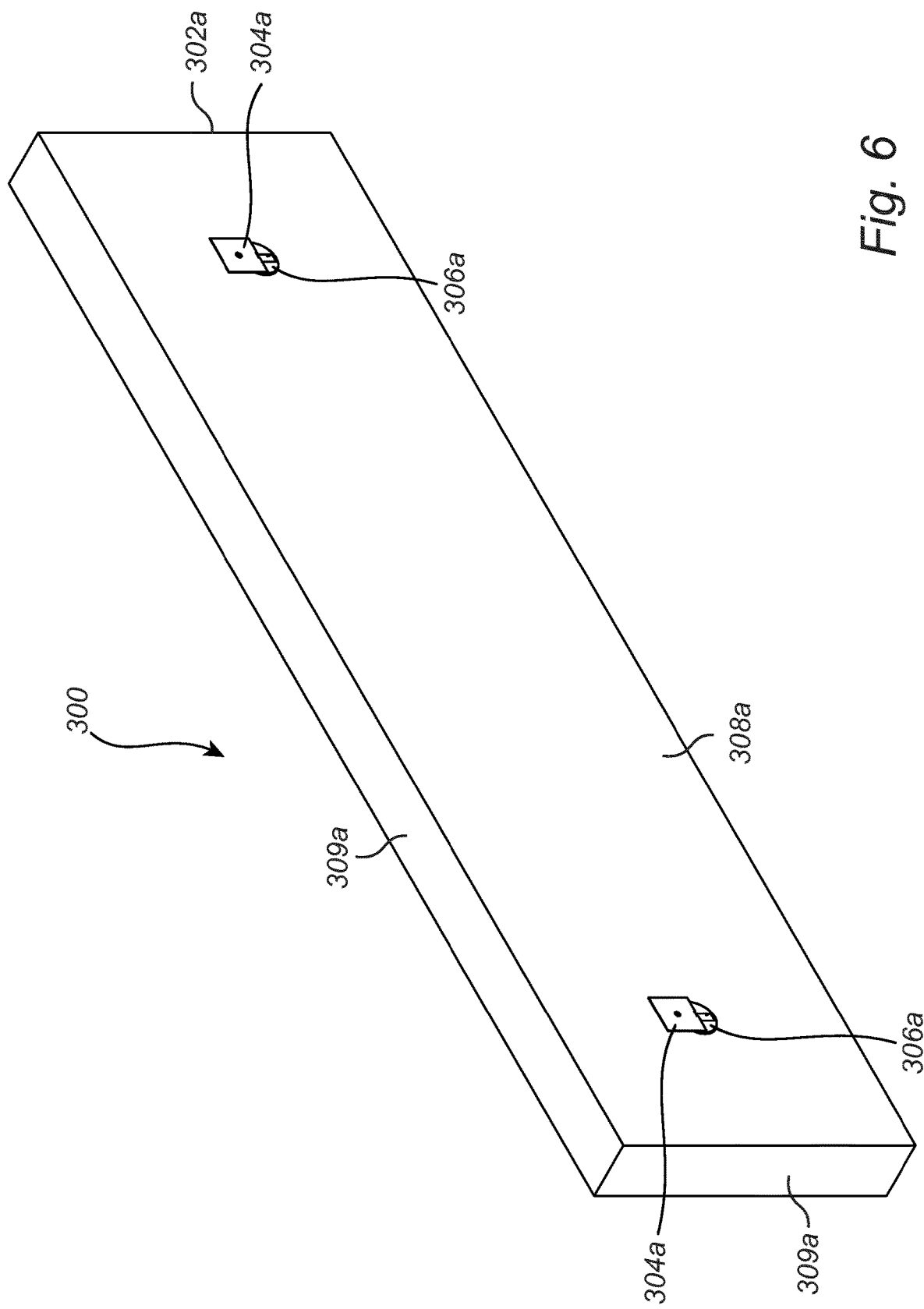
FIG. 6 is a perspective view of a suspended wall panel.

Now referring to FIG. 6, here is conceptually depicted a tile system 300 in form of a wall panel system 300. For reasons of simplicity there is a single planar tile in form a wall panel 302a illustrated in FIG. 6. It is however to be understood that any number of wall panels 302a may be used according to the present inventive concept. The wall panel 302a has a first major surface and an opposing second major surface 308a. Further, the wall panel 302a has four side edge surfaces 309a extending between the respective first and second 308a major surfaces.

The wall panel 302a, comprises compressed mineral fiber material. Suitable examples of compressed mineral fiber material are glass wool, mineral wool and rock wool, however other materials are also conceivable without departing from the scope of the inventive concept. Wall panels comprising the exemplified materials are known to exhibit sound absorbing properties.

The wall panel 302a is suspended by means of two suspension elements 304a in form of wall mounted hooks 304a. Each suspension element 304a includes a hook element. Each suspension element 304a is attached to the wall panel 302a in corresponding attachment points. Each attachment point includes an anchor element 306a. The respective hook elements of the suspension elements 304a are configured to engage the respective engagement members of the anchor elements 306a. The anchor elements 306a are of the type described above in conjunction with FIGS. 2a and 2b. Accordingly, the anchor elements 306a will not be described in detail below to avoid undue repetition.

The anchor elements 306a are screwed into the second major surface 308a of the wall panel 302a. By screwing the anchor elements 306a into second major surface 308a of the wall panel 302a, the wall panel 302a may be vertically suspended by means of the wall mounted hooks 304a as illustrated in FIG. 6.

As is understood, the respective types of anchor elements 106a-f described above may be interchanged with each other to suit specific installation needs. Hence, a suspended ceiling may include a plurality of types of anchor elements 106a-f.

Similarly, a suspended ceiling may include a single type of anchor elements 106a-f. Also the type of suspension elements 104a-f, 104x may be varied within a suspended ceiling or a single type of suspension element 104a-f, 104x may be used. The anchor elements 106a-f described may advantageously be used to fasten or suspend vertically arranged panels or tiles, such as sound absorbing baffles 202a or wall panels 302a, as described above. Also, a tile system 100, 200, 300 may include different types of tiles, such as ceiling tiles 102a-f, baffles 202a and wall panels 302a. In other words, a single tile system 100, 200, 300 may for instance include a number of ceiling tiles 102a-f and a number of baffles 202a to give an example.

It will be appreciated that the present inventive concept is not limited to the variants shown. Several modifications and variations are thus conceivable within the scope of the invention which thus is exclusively defined by the appended claims.

The invention claimed is:

1. An absorber tile element comprising:
compressed mineral fiber material and having a first major surface, an opposing second major surface, and at least one side edge surface extending between the first major surface and the second major surface; and
an anchor element fastened to one of the first major surface and the second major surface or one of the at least one side edge surface of the absorber tile element,
wherein the anchor element comprises a head portion and a threaded portion, the head portion defining an open cavity facing a top surface of the head portion,
wherein an engagement member is arranged in the cavity such that the engagement member does not protrude beyond the top surface of the head portion, and the engagement member is configured to engage with a hook element, and
wherein the threaded portion is threaded into the absorber tile element from the surface associated with the anchor element such that the head portion becomes substantially recessed in the absorber tile element.

2. The absorber tile element according to claim 1, wherein the engagement member comprises an elongated bar structure traversing the cavity of the head portion.

3. The absorber tile element according to claim 1, wherein the engagement member comprises a loop structure arranged in the cavity of the head portion.

4. The absorber tile element according to claim 1, wherein the engagement member is laterally displaced with respect to a central axis of the anchor element.

5. The absorber tile element according to claim 1, wherein the anchor element is provided with a through hole extending along a central axis of the anchor element.

6. The absorber tile element according to claim 1, wherein the anchor element has an extension in the interval of 10-150 mm along a central axis thereof.

7. The absorber tile element according to claim 1, wherein the anchor element has an extension in the interval of 15-100 mm along a central axis thereof.

8. The absorber tile element according to claim 1, wherein the anchor element has an extension in the interval of 10-100 mm in a direction transverse to a central axis thereof.

9. The absorber tile element according to claim 1, wherein the anchor element has an extension in the interval of 15-60 mm in a direction transverse to a central axis thereof.

10. The absorber tile element according to claim 1, wherein the threaded portion of the anchor element comprises threads having a pitch in the interval of 4-10 mm.

11. The absorber tile element according to claim 1, wherein the threaded portion of the anchor element comprises threads having a pitch in the interval of 5-7 mm.

12. A tile system comprising:
an absorber tile element according to claim 1; and
a suspension element releasably coupled to the anchor element of the absorber tile element to suspend the absorber tile element,
wherein the suspension element comprises a hook element hooking the engagement member of the anchor element.

13. The tile system according to claim 12, wherein the engagement member or the hook element is configured to align a body of the suspension element with a central axis of the anchor element.

14. The tile system according to claim 12, wherein the engagement member and the hook element are configured to align a body of the suspension element with a central axis of the anchor element.

* * * * *